(12) United States Patent
Wakabayashi

(10) Patent No.: US 12,474,411 B2
(45) Date of Patent: Nov. 18, 2025

(54) BATTERY MANAGEMENT APPARATUS

(71) Applicant: SUBARU CORPORATION, Tokyo (JP)

(72) Inventor: Kenta Wakabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 187 days.

(21) Appl. No.: 18/450,729

(22) Filed: Aug. 16, 2023

(65) Prior Publication Data

US 2024/0085488 A1 Mar. 14, 2024

(30) Foreign Application Priority Data

Sep. 8, 2022 (JP) ................. 2022-142967

(51) Int. Cl.
| | | |
|---|---|---|
| *G01R 31/392* | (2019.01) | |
| *B60L 58/12* | (2019.01) | |
| *B60L 58/25* | (2019.01) | |
| *G01R 31/3842* | (2019.01) | |
| *G01R 31/389* | (2019.01) | |
| *H01M 10/42* | (2006.01) | |
| *H01M 10/48* | (2006.01) | |

(52) U.S. Cl.
CPC .......... *G01R 31/392* (2019.01); *B60L 58/12* (2019.02); *B60L 58/25* (2019.02); *G01R 31/3842* (2019.01); *G01R 31/389* (2019.01); *H01M 10/4257* (2013.01); *H01M 10/486* (2013.01); *B60L 2240/545* (2013.01); *B60L 2240/547* (2013.01); *B60L 2240/549* (2013.01); *H01M 2010/4271* (2013.01); *H01M 2220/20* (2013.01)

(58) Field of Classification Search
CPC ................. H01M 2010/4217; H01M 220/20
See application file for complete search history.

(56) References Cited

U.S. PATENT DOCUMENTS 5,606,243 A * 2/1997 Sakai ................. G01R 31/3648
320/152
8,972,161 B1 * 3/2015 Koebler .................... B60T 1/10
701/123
(Continued)

FOREIGN PATENT DOCUMENTS

JP 2009-103471 A 5/2009

*Primary Examiner* — Hitesh Patel
*Assistant Examiner* — Tabitha Kress
(74) *Attorney, Agent, or Firm* — Rimon P.C.

(57) ABSTRACT

A battery management apparatus includes a battery, a storage device, and a controller. The controller includes at least one processor and at least one memory coupled to the processor. Output maps corresponding to deterioration levels are preliminarily stored in the storage device. In each output map, a maximum value of electric power outputtable from the battery is associated with a state-of-charge and a temperature of the battery. Each deterioration level is an indicator indicating a degree of deterioration of the battery. The processor is configured to: derive, as an estimate resistance value, an estimate value of internal resistance of the battery; derive the deterioration level at a derivation point of the estimate resistance value based on the estimate resistance value; determine an output map corresponding to the derived deterioration level from the output maps; and control the electric power to be output from the battery based on the output map.

4 Claims, 10 Drawing Sheets

(56) References Cited

U.S. PATENT DOCUMENTS

| | | | | |
|---|---|---|---|---|
| 2010/0250163 A1* | 9/2010 | Maegawa | .......... | G01R 31/3842 |
| | | | | 702/63 |
| 2013/0271148 A1* | 10/2013 | Maeda | ................ | G01R 31/392 |
| | | | | 324/426 |
| 2023/0075768 A1* | 3/2023 | Kitagawa | ................ | B60L 58/13 |

* cited by examiner

FIG. 2

| ELECTRIC POWER (OUTPUT) [kW] | SOC [%] | | | | | | | | | |
|---|---|---|---|---|---|---|---|---|---|---|
| BATTERY TEMPERATURE [°C] | 10 | 20 | 30 | 40 | 50 | 60 | 70 | 80 | 90 | 100 |
| -30 | 0 | 0 | 1 | 1 | 1 | 1 | 1 | 1 | 1 | 1 |
| -20 | 0 | 0 | 3 | 3 | 3 | 3 | 3 | 3 | 3 | 3 |
| -10 | 0 | 0 | 7 | 18 | 23 | 24 | 25 | 26 | 26 | 26 |
| 0 | 0 | 0 | 12 | 24 | 24 | 25 | 26 | 26 | 26 | 26 |
| 10 | 0 | 0 | 17 | 25 | 25 | 25 | 26 | 26 | 26 | 26 |
| 20 | 0 | 0 | 23 | 26 | 26 | 26 | 26 | 26 | 26 | 26 |
| 30 | 0 | 0 | 25 | 26 | 26 | 26 | 26 | 26 | 26 | 26 |
| 40 | 0 | 0 | 26 | 26 | 26 | 26 | 26 | 26 | 26 | 26 |
| 50 | 0 | 0 | 6 | 6 | 6 | 6 | 6 | 6 | 6 | 6 |
| 60 | 0 | 0 | 0 | 0 | 0 | 0 | 0 | 0 | 0 | 0 |

DETERIORATION LEVEL: 1.0
DETERIORATION LEVEL: 1.1
DETERIORATION LEVEL: 1.2

BATTERY MANAGEMENT APPARATUS

CROSS-REFERENCE TO RELATED APPLICATIONS

The present application claims priority from Japanese Patent Application No. 2022-142967 filed on Sep. 8, 2022, the entire contents of which are hereby incorporated by reference.

BACKGROUND

The disclosure relates to battery management apparatuses.

For example, Japanese Unexamined Patent Application Publication (JP-A) No. 2009-103471 discloses a technology for estimating a deterioration level indicating the degree of deterioration of a battery. In JP-A No. 2009-103471, the ratio of an estimate internal resistance value of a current battery to an internal resistance value of a new battery is calculated as the deterioration level.

SUMMARY

An aspect of the disclosure provides a battery management apparatus. The battery management apparatus includes a battery, a storage device, and a controller. The controller includes at least one processor and at least one memory coupled to the at least one processor. Output maps corresponding respectively to deterioration levels are preliminarily stored in the storage device. Each of the output maps is a map in which a maximum value of electric power outputtable from the battery is associated with a state-of-charge of the battery and a temperature of the battery. Each of the deterioration levels is an indicator indicating a degree of deterioration of the battery. The at least one processor is configured to execute a process including deriving, as an estimate resistance value, an estimate value of internal resistance of the battery, deriving the deterioration level at a derivation point of the estimate resistance value based on the estimate resistance value, determining the output map corresponding to the derived deterioration level from the output maps, and controlling the electric power to be output from the battery based on the output map.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 illustrates an example of output maps stored in a storage device;

DETAILED DESCRIPTION

For example, when the temperature of a battery changes, the electric power outputtable from the battery changes. The electric power outputtable from the battery also changes as deterioration of the battery progresses. It is desirable that the electric power outputtable from the battery be managed in view of the deterioration of the battery.

It is desirable to provide a battery management apparatus that can appropriately manage the electric power to be output from a battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
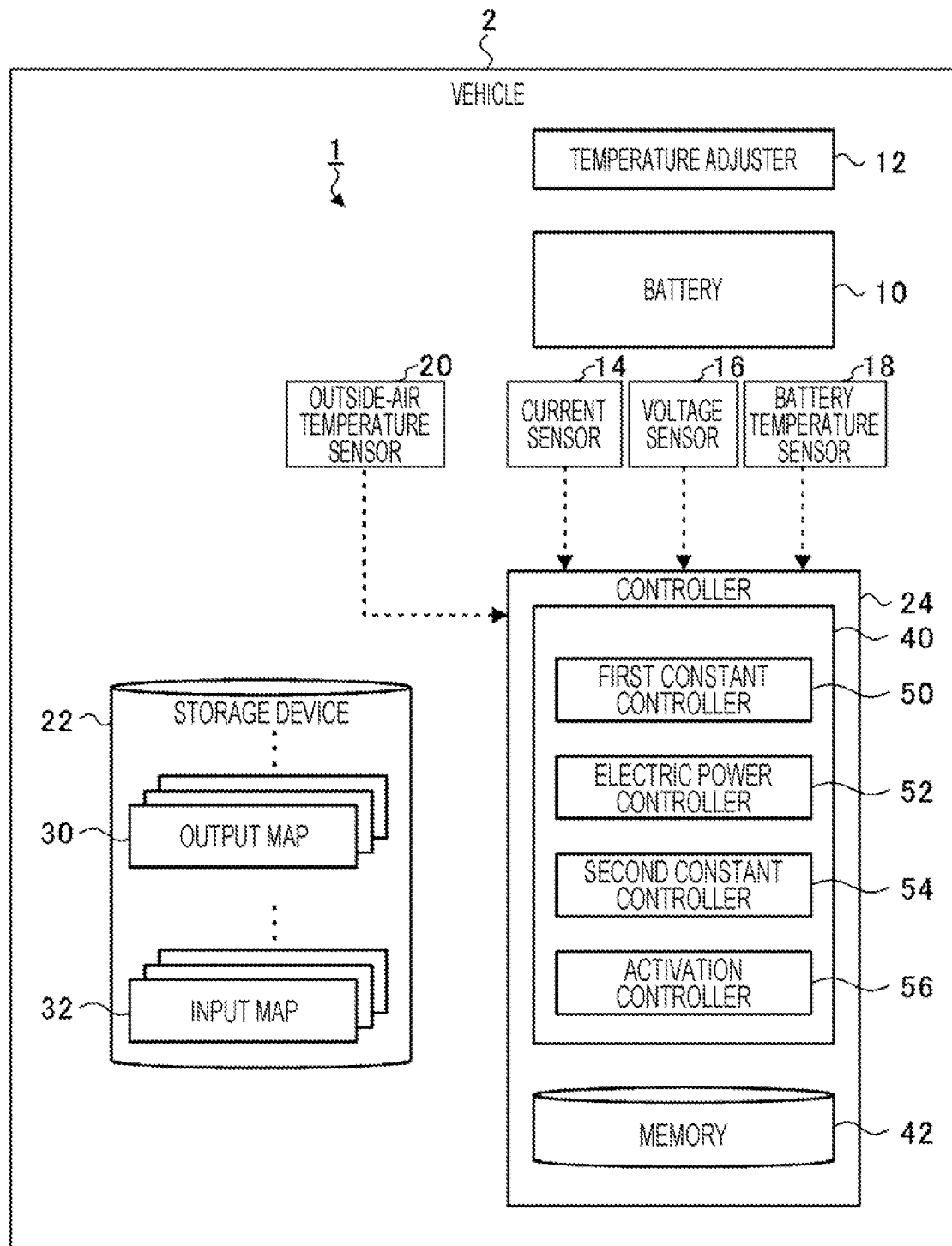
FIG. 1 schematically illustrates the configuration of a battery management apparatus according to an embodiment.

FIG. 1 schematically illustrates the configuration of a battery management apparatus 1 according to this embodiment. The battery management apparatus 1 is applied to, for example, a vehicle 2. The vehicle 2 is, for example, an electric automobile equipped with a motor generator as a driving source. Alternatively, the vehicle 2 may be a hybrid electric automobile equipped with a motor generator and an engine as driving sources.

The battery management apparatus 1 includes a battery 10, a temperature adjuster 12, a current sensor 14, a voltage sensor 16, a battery temperature sensor 18, an outside-air temperature sensor 20, a storage device 22, and a controller 24.

The battery 10 is, for example, a lithium-ion battery and is a dischargeable and rechargeable secondary battery. The battery 10 can supply electric power to various types of devices, such as the motor generator serving as a driving source and the temperature adjuster 12, equipped in the vehicle 2.

The temperature adjuster 12 includes a heater and a cooler. For example, when the temperature of the battery 10 is relatively low, the temperature adjuster 12 can increase the temperature of the battery 10 by heating the battery 10. When the temperature of the battery 10 is relatively high, the temperature adjuster 12 can decrease the temperature of the battery 10 by cooling the battery 10. The temperature of the battery 10 may sometimes be referred to as "battery temperature" hereinafter.

The current sensor 14 detects the electric current of the battery 10. The voltage sensor 16 detects the voltage of the battery 10. The battery temperature sensor 18 detects the battery temperature. The outside-air temperature sensor 20 detects the temperature of the air outside the vehicle 2, that is, the outside-air temperature.

The storage device 22 is formed of a nonvolatile storage element. A nonvolatile storage element may include an electrically readable-writable nonvolatile storage element, such as a flash memory. Output maps 30 and input maps 32 are preliminarily stored in the storage device 22.

FIG. 2 illustrates an example of the output maps 30 stored in the storage device 22. As illustrated in FIG. 2, in each output map 30, a maximum value of electric power outputtable from the battery 10 is associated with each of states-of-charge (SOC) and each of battery temperatures of the battery 10. The SOC indicates a charge rate expressing a current charge capacity relative to a full charge capacity of the battery 10 in percentage.

An indicator indicating the degree of deterioration of the battery 10 will be referred to as a deterioration level of the battery 10. An initial deterioration level of the battery 10 is "1.0". The deterioration level increases as the deterioration of the battery 10 progresses. For example, a deterioration level of "1.1" indicates that the deterioration has progressed relative to the deterioration level of "1.0", and a deterioration level of "1.2" indicates that the deterioration has progressed relative to the deterioration level of "1.1".

As illustrated in FIG. 2, an output map 30 is provided for each deterioration level of the battery 10. In other words, the output maps 30 corresponding to the respective deterioration levels are preliminarily stored in the storage device 22.

Although not illustrated, each input map 32 is a map in which a maximum value of electric power inputtable to the battery 10, that is, a maximum value of rechargeable electric power, is associated with each of the SOCs and each of the battery temperatures of the battery 10. Similar to the output maps 30, an input map 32 is provided for each deterioration level of the battery 10. In other words, the input maps 32 corresponding to the respective deterioration levels are preliminarily stored in the storage device 22.

Referring back to FIG. 1, the controller 24 includes at least one processor 40 and at least one memory 42 coupled to the processor 40. The memory 42 includes a read-only memory (ROM) storing a program and a random access memory (RAM) serving as a work area. The processor 40 operates in cooperation with the program included in the memory 42 so as to implement various types of control of the battery management apparatus 1. Moreover, the processor 40 executes the program to serve as a first constant controller 50, an electric power controller 52, a second constant controller 54, and an activation controller 56.

The first constant controller 50 derives an estimate resistance value as an estimate value of internal resistance of the battery 10 during an energization mode of the battery 10. An energization mode of the battery 10 indicates that electric power is output from the battery 10 to the outside or that electric power is input to the battery 10 from the outside. Based on the derived estimate resistance value, the first constant controller 50 derives a deterioration level of the battery 10 at the derivation point of the estimate resistance value.

The first constant controller 50 determines the output map 30 corresponding to the derived deterioration level from among the output maps 30 stored in the storage device 22.

The electric power controller 52 controls the electric power to be output from the battery 10 based on the determined output map 30.

The first constant controller 50 may determine the input map 32 corresponding to the derived deterioration level from among the input maps 32 stored in the storage device 22 concurrently with the determining the output map 30 to be used. The electric power controller 52 may control the electric power to be input to the battery 10 based on the determined input map 32.

Figure 3:
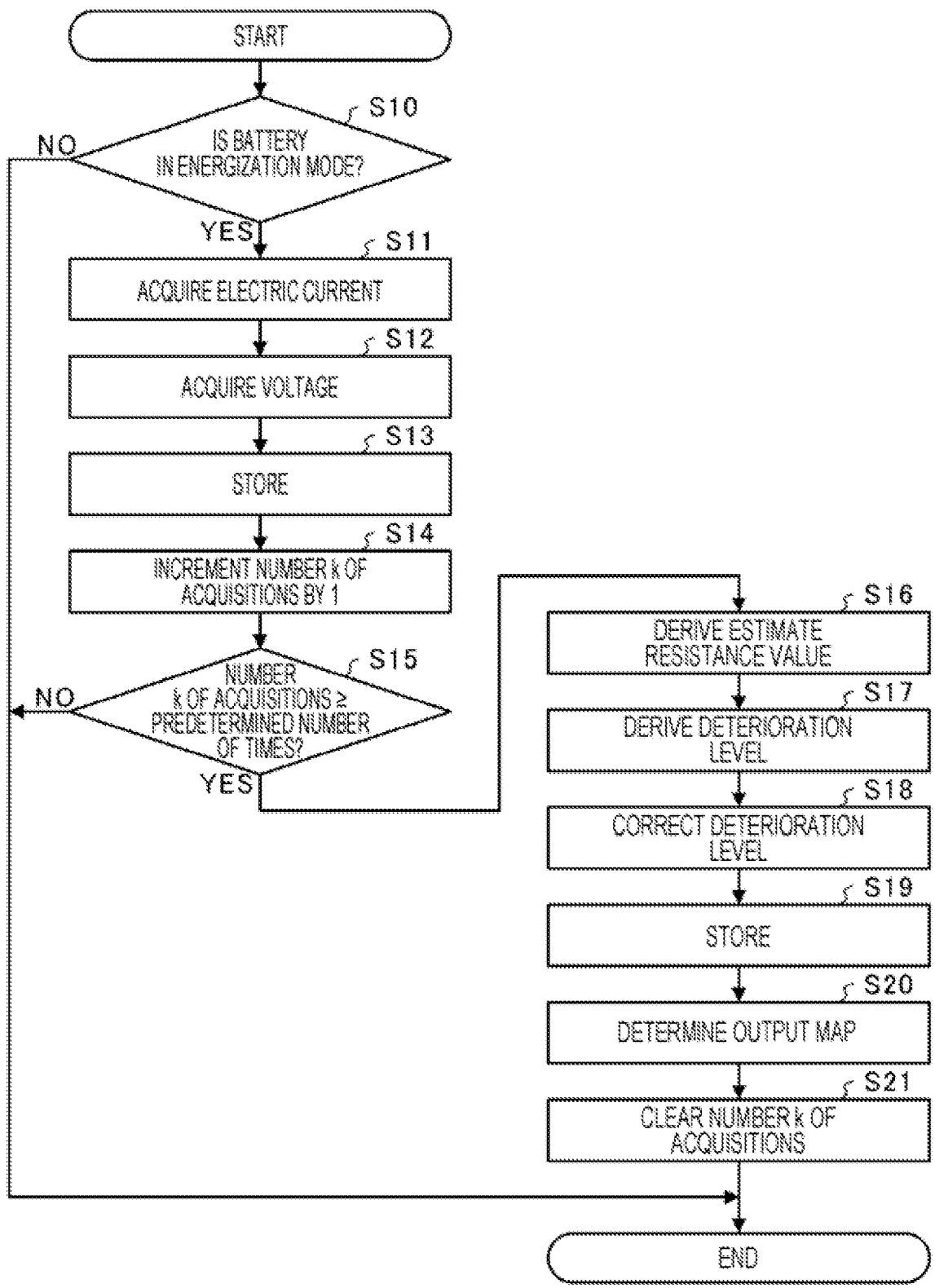
FIG. 3 is a flowchart describing the flow of operation performed by a first constant controller.

FIG. 3 is a flowchart describing the flow of operation performed by the first constant controller 50. The first constant controller 50 repeatedly executes the series of processing in FIG. 3 every time a predetermined interrupt timing is reached during a predetermined first cycle. The predetermined first cycle is set to, for example, 100 ms, but is not limited thereto and may be set to any time period.

When the predetermined interrupt timing is reached, the first constant controller 50 determines whether the battery 10 is in the energization mode in step S10. If the battery 10 is not in the energization mode (NO in step S10), the current series of processing ends.

If the battery 10 is in the energization mode (YES in step S10), the first constant controller 50 acquires an electric current detected by the current sensor 14 in step S11. In step S12, the first constant controller 50 acquires a voltage detected by the voltage sensor 16. In step S13, the first constant controller 50 causes the storage device 22 to store the acquired electric current and the acquired voltage. In step S14, the first constant controller 50 increments the number k of acquisitions of the electric current and the voltage by 1.

In step S15, the first constant controller 50 determines whether the number k of acquisitions is larger than or equal to a predetermined number of times. The predetermined number of times is set to, for example, 300 times, but is not limited thereto and may be set to any number of times.

If the number k of acquisitions is smaller than the predetermined number of times (NO in step S15), the first constant controller 50 ends the series of processing. In other words, the first constant controller 50 causes the storage device 22 to accumulate the electric current and the voltage corresponding to the predetermined number of times.

If the number k of acquisitions is larger than or equal to the predetermined number of times (YES in step S15), the first constant controller 50 derives an estimate resistance value based on the electric current and the voltage corresponding to the predetermined number of times in step S16 since the electric current and the voltage corresponding to the predetermined number of times are accumulated.

Figure 4:
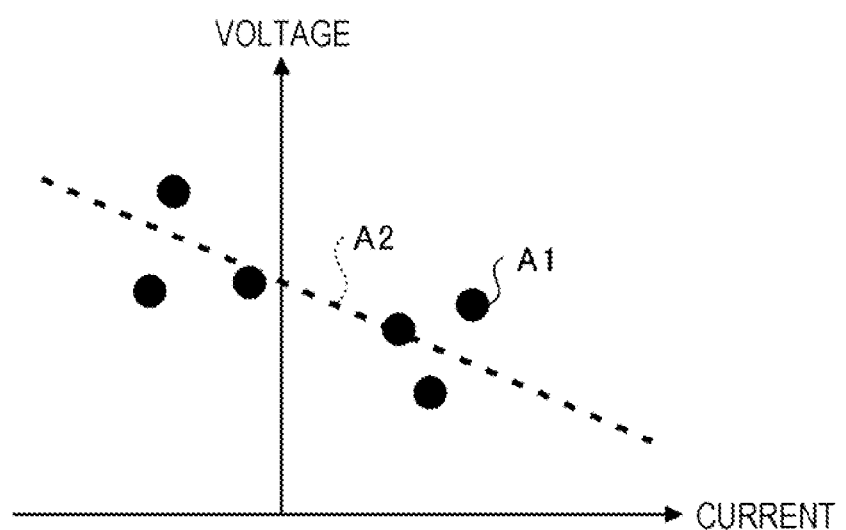
FIG. 4 illustrates a method of how an estimate resistance value is derived by the first constant controller.

FIG. 4 illustrates a method of how an estimate resistance value is derived by the first constant controller 50. In FIG. 4, the abscissa axis denotes an electric current, whereas the ordinate axis denotes a voltage. Each black circular mark A1 in FIG. 4 is a plot indicating the relationship between a voltage and an electric current that have been acquired until the number k of acquisitions reaches the predetermined number of times. Although the number of black circular marks A1 each indicating a plot of an electric current and a voltage actually corresponds to the predetermined number of times, the number of black circular marks A1 displayed in FIG. 4 is reduced to simplify the drawing.

The first constant controller 50 applies the least squares method to the electric currents and the voltages to derive a regression line indicated with a dashed line A2 in FIG. 4. The first constant controller 50 derives a gradient of the derived regression line and sets the gradient as an estimate resistance value.

Referring back to FIG. 3, after deriving the estimate resistance value, the first constant controller 50 derives a deterioration level of the battery 10 based on the derived estimate resistance value in step S17. For example, a reference resistance value as an initial resistance value of the battery 10 is preliminarily stored in the storage device 22.

The first constant controller 50 divides the derived estimate resistance value by the reference resistance value so as to derive the deterioration level (deterioration level=estimate resistance value/reference resistance value).

Then, in step S18, the first constant controller 50 corrects the derived deterioration level. In addition to being derived by the first constant controller 50, a deterioration level is also derived by the activation controller 56 to be described later. This may lead to an occurrence of a situation where the deterioration level determined prior to the current deterioration level, that is, the previous deterioration value, is a deterioration level derived by the activation controller 56. The accuracy of the deterioration level derived by the activation controller 56 can be made higher than that of the deterioration level derived by the first constant controller 50. In view of this, the first constant controller 50 corrects the deterioration level to partially reflect the previous deterioration level on the currently-derived deterioration level.

In one example, the first constant controller 50 combines the deterioration level derived based on the current estimate resistance value with the deterioration level determined prior to the derivation of the deterioration level in accordance with a predetermined ratio, so as to correct the deterioration level derived based on the estimate resistance value. For example, the first constant controller 50 derives the corrected deterioration level in accordance with Expression (1) indicated below. Although a reflection rate in Expression (1) is set to, for example, 0.2, the reflection rate may be set to any value.

$$\text{Corrected Deterioration Level} = \text{Derived Deterioration Level} \times \text{Reflection Rate} + \text{Previous Deterioration Level} \times (1 - \text{Reflection Rate}) \quad (1)$$

With the deterioration level being corrected in this manner, assuming that the accuracy of the previous deterioration level is high and the accuracy of the current deterioration level is low, the previous deterioration level is partially reflected on the current deterioration level, so that reduced accuracy of the latest deterioration level can be suppressed.

In step S19, the first constant controller 50 causes the storage device 22 to store the corrected deterioration level as the latest deterioration level, thereby updating the deterioration level.

Subsequently, in step S20, the first constant controller 50 determines the output map 30 corresponding to the corrected deterioration level from among the output maps 30. Accordingly, the electric power controller 52 controls the electric power to be output from the battery 10 hereinafter based on the determined output map 30.

For example, although an output map 30 for a deterioration level of "1.1" and an output map 30 for a deterioration level of "1.2" are stored in the storage device 22, an output map 30 for a deterioration level of "1.15" is not stored in the storage device 22, and a situation where the corrected deterioration level is "1.15" may possibly occur. In such a case, the first constant controller 50 may create an output map 30 corresponding to the deterioration level of "1.15" by performing linear interpolation on the electric power in the output map 30 corresponding to the deterioration level of "1.1" and the electric power in the output map 30 corresponding to the deterioration level of "1.2". The first constant controller 50 may determine the output map 30 created in this manner as the output map 30 corresponding to the corrected deterioration level.

In addition to determining the output map 30, the first constant controller 50 may determine the input map 32 corresponding to the corrected deterioration level from among the input maps 32.

In step S21, the first constant controller 50 clears the number k of acquisitions and ends the series of processing. By clearing the number k of acquisitions, the first constant controller 50 can derive a subsequent estimate resistance value based on an electric current and a voltage accumulated upon clearing the number k of acquisitions.

FIG. 3 corresponds to an example where the derived deterioration level is corrected. However, if reduced accuracy of the deterioration level is permissible, the correction of the deterioration level may be omitted. In that case, the first constant controller 50 causes the storage device 22 to store the derived deterioration level as the latest deterioration level in step S19. Then, the first constant controller 50 determines the output map 30 corresponding to the derived deterioration level from among the output maps 30 in step S20.

If the output map 30 corresponding to the derived deterioration level is not stored in the storage device 22, the first constant controller 50 may create an output map 30 corresponding to the derived deterioration level by performing linear interpolation on the output maps 30 stored in the storage device 22. The first constant controller 50 may determine the output map 30 created in this manner as the output map 30 to be used. In addition to determining the output map 30, the first constant controller 50 may determine the input map 32 corresponding to the derived deterioration level from among the input maps 32 as the input map 32 corresponding to the deterioration level.

In the method of how the first constant controller 50 derives an estimate resistance value, the accuracy of the estimate resistance value decreases, as compared with a method of how the activation controller 56 derives an estimate resistance value, which will be described later. However, the estimate resistance value can be derived without being limited to the traveling of the vehicle 2. On the other hand, in the method of how the activation controller 56 derives an estimate resistance value, although the traveling of the vehicle 2 is limited during the deriving process of the estimate resistance value, the accuracy of the estimate resistance value can be enhanced, as compared with the method of how the first constant controller 50 derives an estimate resistance value. In view of this, in the battery management apparatus 1, the activation controller 56 derives an estimate resistance value at a specific timing when the vehicle 2 is activated, whereas the first constant controller 50 derives an estimate resistance value while prioritizing the traveling of the vehicle 2 during a normal mode.

Referring back to FIG. 1, the second constant controller 54 derives an actual electric power as an electric power actually output from the battery 10 based on the measured values of the electric current and the voltage during the energization mode of the battery 10. Based on the currently-determined output map 30, the second constant controller 54 derives a maximum estimate electric power as a maximum estimate value of electric power outputtable from the battery 10.

The second constant controller 54 derives a first deviation rate indicating the degree of deviation of the actual electric power relative to the maximum estimate electric power. The first deviation rate is used in the activation controller 56 to be described later. In one example, the second constant controller 54 preliminarily derives the first deviation rate to be used in the activation controller 56.

If the first deviation rate is above or equal to 1, the actual electric power is higher than the maximum estimate electric power. Therefore, an actual resistance value of the battery 10 is smaller than a resistance value estimated from the maximum estimate electric power. In one example, if the first deviation rate is above or equal to 1, for example, the actual deterioration level is smaller than the currently-determined deterioration level, as in the actual deterioration level being "1.05" relative to the calculated deterioration level being "1.1".

If the first deviation rate is below 1, the actual electric power is lower than the maximum estimate electric power. Therefore, the actual resistance value of the battery 10 is larger than the resistance value estimated from the maximum estimate electric power. In one example, if the first deviation rate is below 1, for example, the actual deterioration level is greater than the currently-determined deterioration level, as in the actual deterioration level being "1.1" relative to the calculated deterioration level being "1.05".

Accordingly, by using the first deviation rate, it is possible to determine whether the deterioration level is to be updated. The activation controller 56 to be described later determines whether the deterioration level is to be updated.

Figure 5:
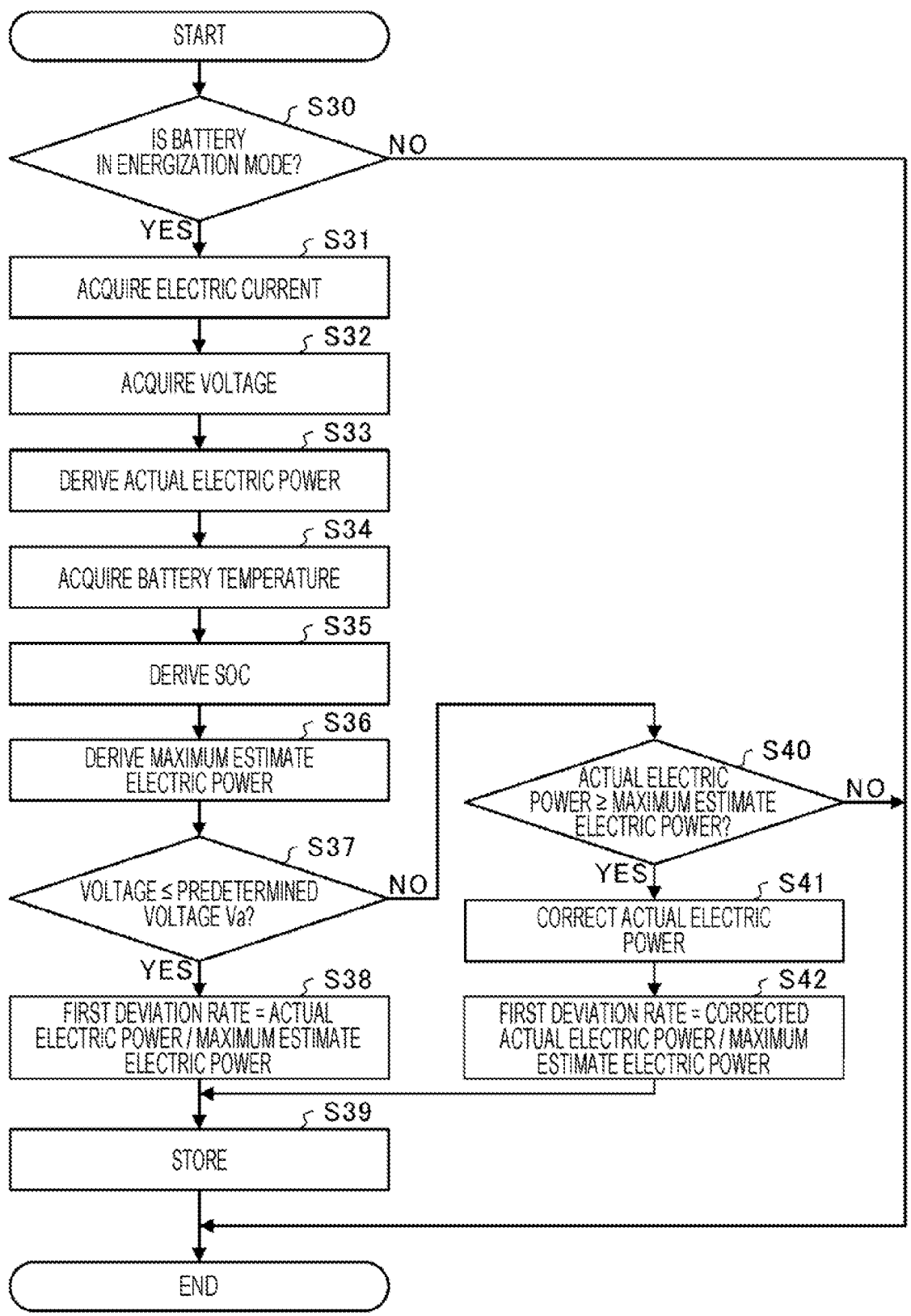
FIG. 5 is a flowchart describing the flow of operation performed by a second constant controller.

FIG. 5 is a flowchart describing the flow of operation performed by the second constant controller 54. The second constant controller 54 repeatedly executes the series of processing in FIG. 5 every time a predetermined interrupt timing is reached during a predetermined second cycle. The predetermined second cycle may be set to the same duration as the first cycle in the first constant controller 50, or may be set to a different duration from the first cycle. The interrupt timing reached in the second cycle and the interrupt timing reached in the first cycle may be in synchronization with each other or may be out of synchronization with each other.

When the predetermined interrupt timing is reached, the second constant controller 54 determines whether the battery 10 is in the energization mode in step S30. If the battery 10 is not in the energization mode (NO in step S30), the current series of processing ends.

If the battery 10 is in the energization mode (YES in step S30), the second constant controller 54 acquires an electric current detected by the current sensor 14 in step S31. In step S32, the second constant controller 54 acquires a voltage detected by the voltage sensor 16. In step S33, the second constant controller 54 multiplies the acquired electric current by the acquired voltage so as to derive an actual electric power (actual electric power=measured electric-current value×measured voltage value).

Subsequently, in step S34, the second constant controller 54 acquires a battery temperature detected by the battery temperature sensor 18. In step S35, the second constant controller 54 derives the SOC of the battery based on the acquired voltage. In step S36, the second constant controller 54 derives a maximum estimate electric power based on the battery temperature and the SOC. For example, the second constant controller 54 sets an electric power determined from the currently-determined output map 30, the acquired battery temperature, and the derived SOC as the maximum estimate electric power.

Then, in step S37, the second constant controller 54 determines whether the acquired voltage is lower than or equal to a predetermined voltage Va. The predetermined voltage Va is set to, for example, a lower limit voltage of an appropriate voltage range of the battery 10.

If the acquired voltage is lower than or equal to the predetermined voltage Va (YES in step S37), the second constant controller 54 divides the derived actual electric power by the derived maximum estimate electric power so as to derive a first deviation rate (first deviation rate=actual electric power/maximum estimate electric power) in step S38. Then, the second constant controller 54 causes the storage device 22 to store the derived first deviation rate so as to update the first deviation rate in step S39, and ends the series of processing.

If the acquired voltage is higher than the predetermined voltage Va (NO in step S37), the second constant controller 54 determines whether the derived actual electric power is higher than or equal to the derived maximum estimate electric power in step S40.

If the actual electric power is lower than the maximum estimate electric power (NO in step S40), the second constant controller 54 does not derive a first deviation rate and ends the series of processing. In this case, the first deviation rate is not updated. If the acquired voltage is lower than or equal to the predetermined voltage Va (NO in step S37) and the actual electric power is lower than the maximum estimate electric power (NO in step S40), the electric current acquired for calculating the actual electric power has decreased. The fact that the acquired electric current has decreased implies that the electric current may possibly contain a relatively large amount of detection error by the current sensor 14. When a first deviation rate is derived using the actual electric power based on such an electric current, the accuracy of the first deviation rate may possibly decrease. In order to prevent the first deviation rate from being updated to a first deviation rate of lower accuracy, the first deviation rate is not to be updated if the actual electric power is lower than the maximum estimate electric power (NO in step S40).

If the actual electric power is higher than or equal to the maximum estimate electric power (YES in step S40), the second constant controller 54 corrects the actual electric power in step S41. The correction of the actual electric power will be described later. In step S42, the second constant controller 54 divides the corrected actual electric power by the derived maximum estimate electric power so as to derive a first deviation rate (first deviation rate=corrected actual electric power/maximum estimate electric power). Then, the second constant controller 54 causes the storage device 22 to store the derived first deviation rate to update the first deviation rate in step S39, and ends the series of processing.

Figure 6:
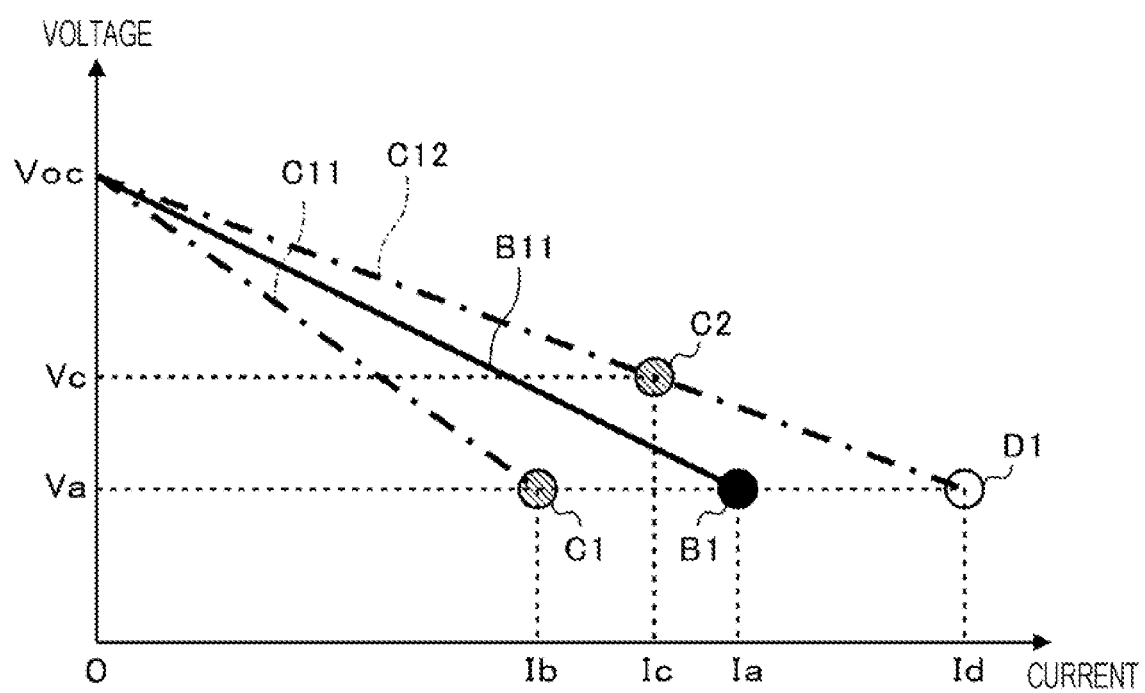
FIG. 6 is a diagram describing a correction of actual electric power by the second constant controller.

FIG. 6 is a diagram describing the correction of the actual electric power by the second constant controller 54. In FIG. 6, the abscissa axis denotes an electric current, whereas the ordinate axis denotes a voltage. In FIG. 6, "Va" corresponds to the predetermined voltage Va serving as a determination criterion in step S37 in FIG. 5. In FIG. 6, "Voc" denotes a voltage, that is, an open-circuit voltage, when the electric current is zero.

A black circular mark B1 in FIG. 6 is an example of a plot corresponding to an electric power on the output map 30. In one example, the black circular mark B1 corresponds to the maximum estimate electric power. The maximum estimate electric power can be expressed by a multiplication of the predetermined voltage Va and an electric current Ia (maximum estimate electric power=Va×Ia).

A solid line B11 indicates a line extending through the open-circuit voltage Voc and the black circular mark B1. A gradient of the solid line B11 indicates an estimate resistance value based on the maximum estimate electric power.

A first shaded circular mark C1 in FIG. 6 is an example of a plot obtained from a measured electric-current value and a measured voltage value when the measured voltage value is the predetermined voltage Va. In one example, the first shaded circular mark C1 corresponds to an example of an actual electric power when a condition indicating whether the voltage in step S37 in FIG. 5 is lower than or equal to the predetermined voltage Va is satisfied. A first actual electric power indicated by the first shaded circular mark C1 can be expressed by a multiplication of the predetermined voltage Va and an electric current Ib lower than the electric current Ia (first actual electric power=Va×Ib).

A single-dot chain line C11 indicates a line extending through the open-circuit voltage Voc and the first shaded circular mark C1. A gradient of the single-dot chain line C11 indicates an estimate resistance value based on the first actual electric power.

As illustrated in FIG. 6, since the gradient of the single-dot chain line C11 is larger than the gradient of the solid line B11, the estimate resistance value based on the first actual electric power is larger than the estimate resistance value based on the maximum estimate electric power. Furthermore, because the voltage is the same at the predetermined voltage Va between the first actual electric power and the maximum estimate electric power and the electric current Ib is lower than the electric current Ia, the first actual electric power is lower than the maximum estimate electric power. In one example, a first deviation rate obtained by dividing the first actual electric power by the maximum estimate electric power is below 1. In this case, the actual deterioration level is greater than the currently-determined deterioration level.

A second shaded circular mark C2 in FIG. 6 is an example of a plot obtained from a measured electric-current value and a measured voltage value when the measured voltage value is a voltage Vc that is higher than the predetermined voltage Va. In one example, the second shaded circular mark C2 corresponds to an example of an actual electric power when a condition indicating that the voltage in step S37 in FIG. 5 is lower than or equal to the predetermined voltage Va is not satisfied and a condition indicating that the actual electric power in step S40 is higher than or equal to the maximum estimate electric power is satisfied. A second actual electric power indicated by the second shaded circular mark C2 can be expressed by a multiplication of the voltage Vc and an electric current Ic (second actual electric power=Vc×Ic). For example, the electric current Ic is lower than the electric current Ia.

A single-dot chain line C12 indicates a line extending through the open-circuit voltage Voc and the second shaded circular mark C2. A gradient of the single-dot chain line C12 indicates an estimate resistance value based on the second actual electric power.

An intersection point between the single-dot chain line C12 and the predetermined voltage Va is indicated by a white circular mark D1. An electric current Id corresponds to the white circular mark D1. The electric current Id is higher than the electric current Ia corresponding to the maximum estimate electric power. The white circular mark D1 corresponds to a second actual electric power obtained after the second actual electric power indicated by the second shaded circular mark C2 is corrected. In one example, the correction of the actual electric power in step S41 in FIG. 5 corresponds to a process involving correcting the second actual electric power (second actual electric power=Vc×Ic) indicated by the second shaded circular mark C2 to the electric power corresponding to the white circular mark D1 (corrected second actual electric power=Va×Id).

In view of this, the second constant controller 54 derives a linear expression indicated by the single-dot chain line C12 from the acquired electric current Ic, the acquired voltage Vc, and the open-circuit voltage Voc in step S41 in FIG. 5. The second constant controller 54 substitutes the predetermined voltage Va into the derived linear expression so as to derive the electric current Id. The second constant controller 54 multiplies the electric current Id by the predetermined voltage Va so as to derive a corrected actual electric power, such as a corrected second actual electric power (corrected actual electric power=Va×Id).

As illustrated in FIG. 6, since the gradient of the single-dot chain line C12 is smaller than the gradient of the solid line B11, an estimate resistance value based on the second actual electric power is smaller than an estimate resistance value based on the maximum estimate electric power. Furthermore, because the voltage is the same at the predetermined voltage Va between the corrected second actual electric power and the maximum estimate electric power and the electric current Id is higher than the electric current Ia, the corrected second actual electric power is higher than the maximum estimate electric power. In one example, a first deviation rate obtained by dividing the corrected second actual electric power by the maximum estimate electric power is above or equal to 1. In this case, the actual deterioration level is smaller than the currently-determined deterioration level.

Referring back to FIG. 1, the activation controller 56 derives an estimate resistance value during activation of the vehicle 2 to which the battery management apparatus 1 is applied. The vehicle 2 is activated when an ignition switch of the vehicle 2 is switched from an off mode to an on mode. A method of how the activation controller 56 derives an estimate resistance value is different from the method of how the first constant controller 50 derives an estimate resistance value. The method of how the activation controller 56 derives an estimate resistance value will be described in detail later.

The activation controller 56 derives a deterioration level of the battery 10 at the derivation point of the estimate resistance value based on the derived estimate resistance value. The activation controller 56 determines the output map 30 corresponding to the derived deterioration level from among the output maps 30. A method of how the activation controller 56 derives a deterioration level and the method of how the activation controller 56 determines an output map 30 are the same as the method of how the first constant controller 50 derives a deterioration level and the method of how the first constant controller 50 determines an output map 30, respectively.

The electric power controller 52 controls the electric power to be output from the battery 10 based on the output map 30 determined by the activation controller 56.

Furthermore, the activation controller 56 determines whether an estimate resistance value is to be derived based on the first deviation rate derived by the second constant controller 54.

Moreover, based on the currently-determined output map 30, the activation controller 56 derives a maximum estimate electric power as a maximum estimate value of electric power outputtable from the battery 10. It is assumed that an electric power to be used for achieving predetermined acceleration in the vehicle 2 to which the battery management apparatus 1 is applied is defined as a predetermined electric power. The predetermined electric power is, for example, a fixed value set in advance and is preliminarily stored in the memory 42.

The activation controller 56 derives a second deviation rate indicating the degree of deviation of the predetermined electric power relative to the maximum estimate electric power. In one example, the activation controller 56 derives the second deviation rate by dividing the predetermined electric power by the maximum estimate electric power (second deviation rate=predetermined electric power/maximum estimate electric power). The activation controller 56 determines whether an estimate resistance value is to be derived based on the second deviation rate.

If the predetermined electric power is higher than or equal to the maximum estimate electric power, the second deviation rate is above or equal to 1. In contrast, if the predetermined electric power is lower than the maximum estimate electric power, the second deviation rate is below 1.

Figure 7:
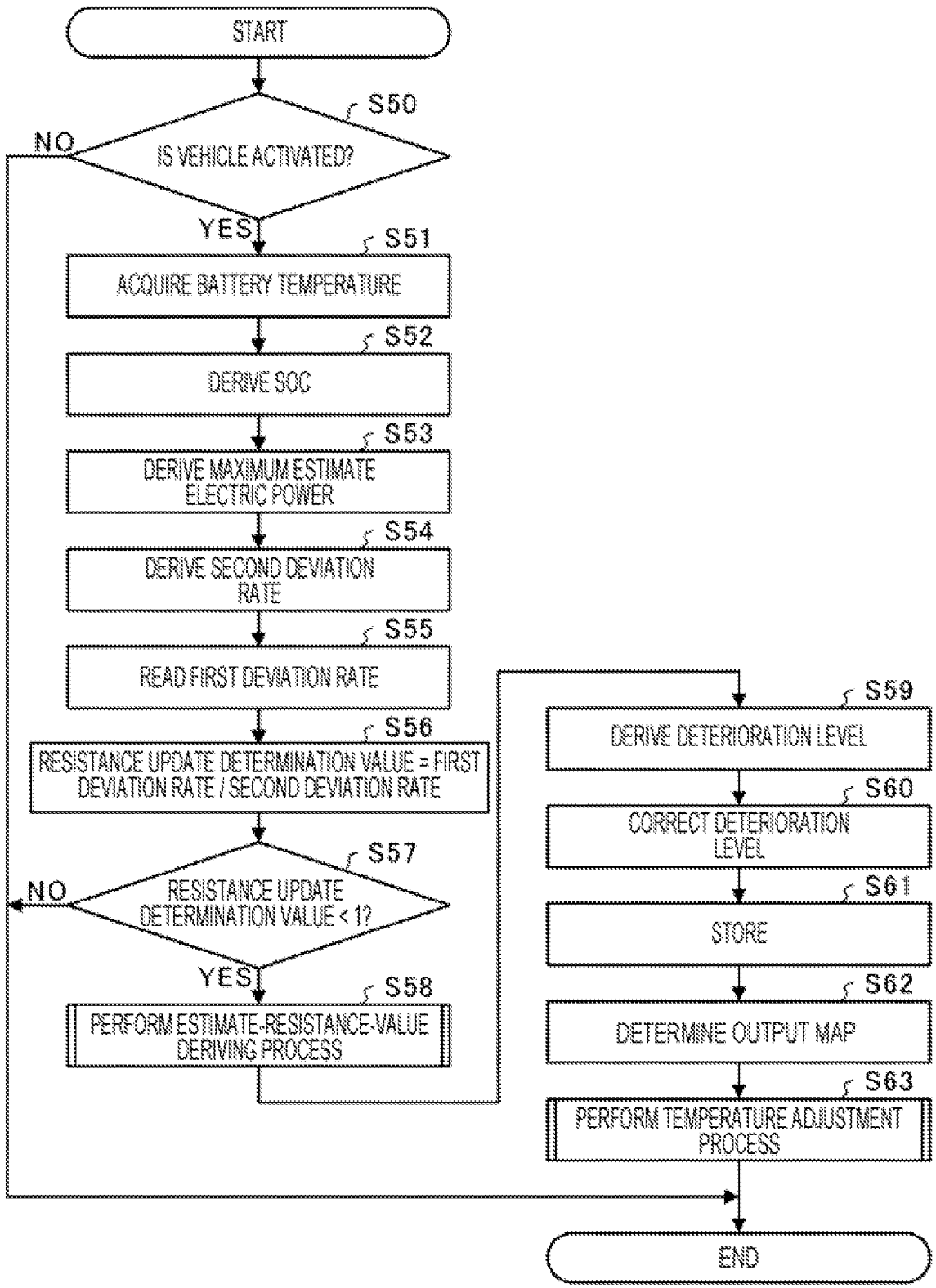
FIG. 7 is a flowchart describing the flow of operation performed by an activation controller.

FIG. 7 is a flowchart describing the flow of operation performed by the activation controller 56. The activation controller 56 waits until activation of the vehicle 2 is detected (NO in step S50).

When activation of the vehicle 2 is detected (YES in step S50), the activation controller 56 acquires a battery temperature detected by the battery temperature sensor 18 in step S51. In step S52, the activation controller 56 acquires a voltage detected by the voltage sensor 16 and derives the SOC of the battery 10 based on the acquired voltage. In step S53, the activation controller 56 derives a maximum estimate electric power based on the battery temperature and the SOC. For example, the activation controller 56 sets an electric power determined from the currently-determined output map 30, the acquired battery temperature, and the derived SOC as the maximum estimate electric power.

Then, in step S54, the activation controller 56 divides the predetermined electric power by the maximum estimate electric power so as to derive a second deviation rate (second deviation rate=predetermined electric power/maximum estimate electric power).

Subsequently, in step S55, the activation controller 56 reads the first deviation rate stored in the storage device 22. In step S56, the activation controller 56 divides the first deviation rate by the second deviation rate so as to derive a resistance update determination value (resistance update determination value=first deviation rate/second deviation rate) indicating a determination target for determining whether an estimate resistance value is to be derived.

As mentioned above, the first deviation rate is a value obtained by dividing the actual electric power or the corrected actual electric power by the maximum estimate electric power, and the second deviation rate is a value obtained by dividing the predetermined electric power by the maximum estimate electric power. Thus, the resistance update determination value obtained by dividing the first deviation rate by the second deviation rate is equal to a value obtained by dividing the actual electric power or the corrected actual electric power by the predetermined electric power (resistance update determination value=first deviation rate/second deviation rate=(actual electric power or corrected actual electric power)/predetermined electric power). In other words, by using the resistance update determination value, the actual electric power or the corrected actual electric power and the predetermined electric power can be compared with each other.

Subsequently, in step S57, the activation controller 56 determines whether the resistance update determination value is smaller than 1. A state where the resistance update determination value is smaller than 1 corresponds to a state where the actual electric power or the corrected actual electric power is lower than the predetermined electric power ((actual electric power or corrected actual electric power)<predetermined electric power). If the actual electric power or the corrected actual electric power is lower than the predetermined electric power, the electric power to be actually output is lower than the electric power to be used for achieving predetermined acceleration in the vehicle 2, so that the deterioration level is to be updated.

In contrast, a state where the resistance update determination value is larger than or equal to 1 corresponds to a state where the actual electric power or the corrected actual electric power is higher than or equal to the predetermined electric power ((actual electric power or corrected actual electric power) predetermined electric power). When the actual electric power or the corrected actual electric power is higher than or equal to the predetermined electric power, the electric power to be actually output is higher than the electric power to be used for achieving predetermined acceleration in the vehicle 2, so that the deterioration level is not to be updated.

In view of this, if the resistance update determination value is larger than or equal to 1 (NO in step S57), the activation controller 56 ends the series of processing. In this case, the activation controller 56 does not derive an estimate resistance value, and the deterioration level is not to be updated.

If the resistance update determination value is smaller than 1 (YES in step S57), the activation controller 56 performs an estimate-resistance-value deriving process in step S58 for updating the deterioration level. The estimate-resistance-value deriving process in step S58 involves the activation controller 56 deriving an estimate resistance value of the battery 10. The estimate-resistance-value deriving process will be described in detail later.

The activation controller 56 derives the resistance update determination value from the first deviation rate and the second deviation rate and determines whether the resistance update determination value is smaller than 1. Alternatively, the activation controller 56 may omit the derivation of the resistance update determination value and directly compare the first deviation rate and the second deviation rate with each other to determine whether to perform the estimate-resistance-value deriving process. In that case, the activation controller 56 may perform the estimate-resistance-value deriving process if the first deviation rate is below the second deviation rate, and may be configured not to perform the estimate-resistance-value deriving process if the first deviation rate is above or equal to the second deviation rate.

Subsequently, the activation controller 56 derives a deterioration level of the battery 10 in step S59 based on the estimate resistance value derived in the estimate-resistance-value deriving process in step S58. For example, the activation controller 56 divides the estimate resistance value by the reference resistance value so as to derive the deterioration level (deterioration level=estimate resistance value/reference resistance value).

Then, in step S60, the activation controller 56 corrects the derived deterioration level. In one example, the activation controller 56 combines the deterioration level derived based on the current estimate resistance value with the deterioration level determined prior to the derivation of the deterioration level in accordance with a predetermined ratio, so as to correct the deterioration level derived based on the estimate resistance value. For example, the activation controller 56 derives the corrected deterioration level in accordance with Expression (1) indicated above, similarly to how the first constant controller 50 corrects the deterioration level.

In step S61, the activation controller 56 causes the storage device 22 to store the corrected deterioration level as the latest deterioration level, thereby updating the deterioration level.

Subsequently, in step S62, the activation controller 56 determines the output map 30 corresponding to the corrected deterioration level from among the output maps 30. Accordingly, the electric power controller 52 controls the electric power to be output from the battery 10 hereinafter based on the determined output map 30.

If the output map 30 corresponding to the derived deterioration level is not stored in the storage device 22, the activation controller 56 may create an output map 30 corresponding to the derived deterioration level by performing linear interpolation on the output maps 30 stored in the storage device 22. In addition to determining the output map 30, the activation controller 56 may determine the input map 32 corresponding to the derived deterioration level from among the input maps 32.

In FIG. 7, the correction of the deterioration level may be omitted. In that case, the activation controller 56 causes the storage device 22 to store the derived deterioration level as the latest deterioration level in step S61. Then, the activation controller 56 determines the output map 30 corresponding to the derived deterioration level from among the output maps 30 in step S62.

Subsequently, the activation controller 56 performs a temperature adjustment process in step S63, and then ends the series of processing. The temperature adjustment process in step S63 involves heating or cooling the battery 10 to contain the battery temperature within a predetermined appropriate range if the battery temperature is outside the appropriate range. The temperature adjustment process in step S63 will be described in detail later.

Figure 8:
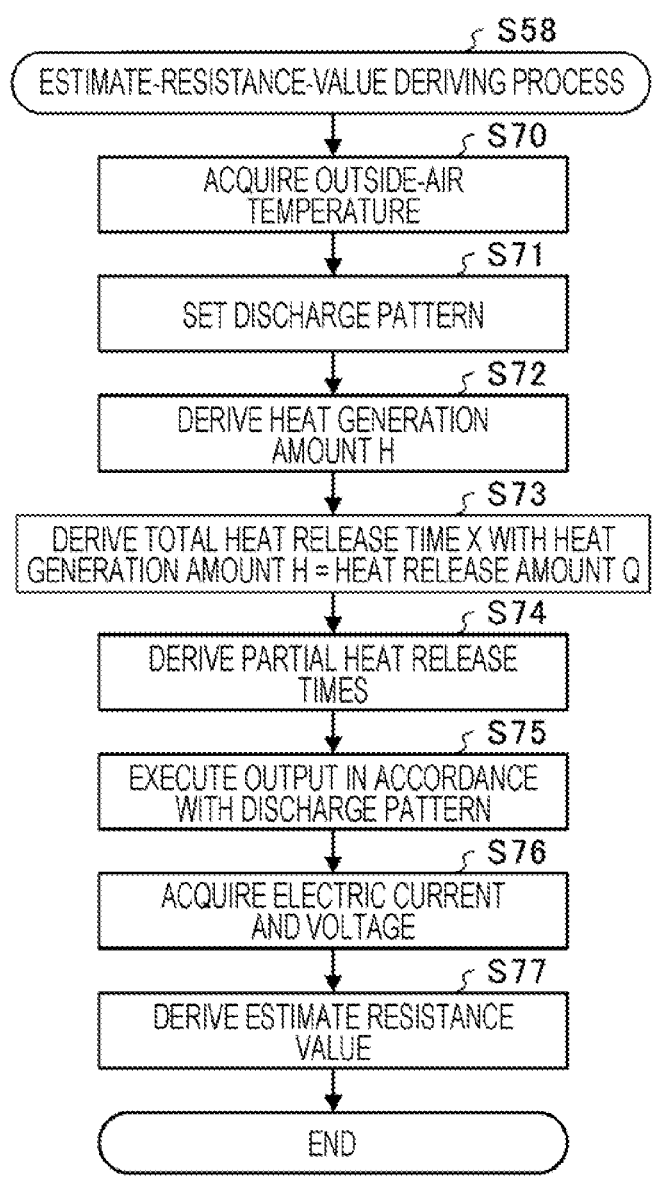
FIG. 8 is a flowchart describing the flow of an estimate-resistance-value deriving process.

FIG. 8 is a flowchart describing the flow of the estimate-resistance-value deriving process in step S58. When the estimate-resistance-value deriving process commences in step S58, the activation controller 56 acquires an outside-air temperature detected by the outside-air temperature sensor 20 in step S70.

Then, in step S71, the activation controller 56 sets a discharge pattern indicating a temporal transition of electric power output from the battery 10. In this case, the activation controller 56 sets the discharge pattern such that a heat generation amount of the battery 10 and a heat release amount of the battery 10 are equal to each other. The term "discharge" refers to supplying of electric power from the battery 10 to a predetermined load. The predetermined load is, for example, the temperature adjuster 12.

Figure 9:
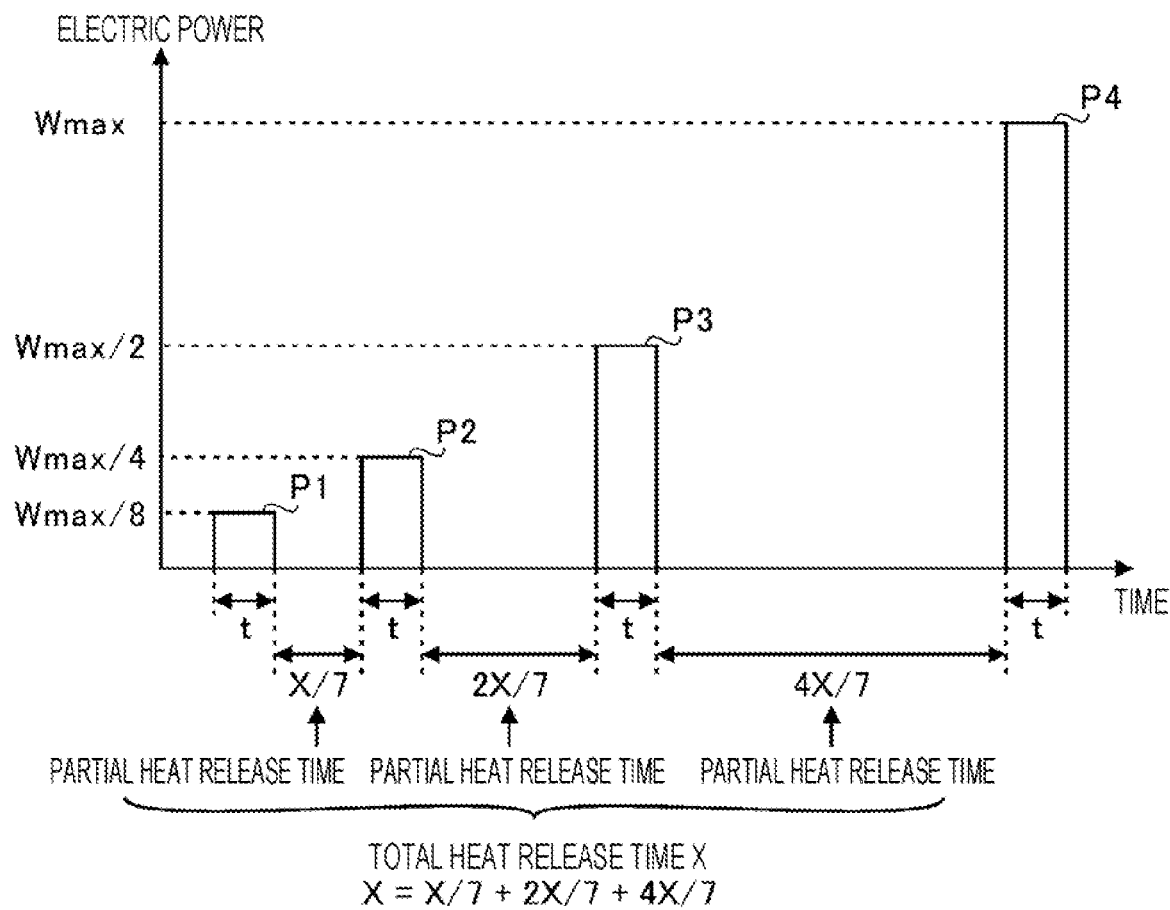
FIG. 9 illustrates an example of a discharge pattern.

FIG. 9 illustrates an example of the discharge pattern. As illustrated in FIG. 9, the activation controller 56 sets the discharge pattern in which pulsed electric power is output multiple times. An output time t corresponding to a pulse width of the pulsed electric power is the same among the pulses.

The activation controller 56 sets the discharge pattern such that the electric power is varied among the individual pulses. For example, the activation controller 56 sets the discharge pattern such that the pulsed electric power gradually increases as time elapses. In one example, the activation controller 56 sets the discharge pattern in which a first pulse P1 with an electric power of "Wmax/8", a second pulse P2 with an electric power of "Wmax/4", a third pulse P3 with an electric power of "Wmax/2", and a fourth pulse P4 with an electric power of "Wmax" are output in this order. "Wmax" denotes a maximum value of electric power.

An interval between neighboring pulses in the discharge pattern may sometimes be referred to as "partial heat release time". A total time of multiple partial heat release times in the discharge pattern may sometimes be referred to as "total heat release time".

The activation controller 56 sets the discharge pattern with varied partial heat release times. For example, the activation controller 56 sets the discharge pattern such that the duration of each partial heat release time gradually increases as time elapses. In one example, the activation controller 56 sets the partial heat release time between the first pulse P1 and the second pulse P2 to "X/7". The activation controller 56 sets the partial heat release time between the second pulse P2 and the third pulse P3 to "2X/7". The activation controller 56 sets the partial heat release time between the third pulse P3 and the fourth pulse P4 to "4X/7". "X" denotes a total heat release time obtained by adding together the partial heat release time "X/7", the partial heat release time "2X/7", and the partial heat release time "4X/7".

In the output time t in which electric power is output, for example, the temperature adjuster 12 consumes the electric power of the battery 10 to heat the battery 10 and to increase the battery temperature. In contrast, in each partial heat release time in which electric power is not output, the battery 10 is cooled by outside air, so that the battery temperature decreases. In the discharge pattern, the total heat release time X that balances out the increase and the decrease of the battery temperature is set.

Referring back to FIG. 8, after setting the discharge pattern, the activation controller 56 derives a heat generation amount H of the battery 10 in accordance with the set discharge pattern in step S72. When the discharge pattern illustrated in FIG. 9 is set, the activation controller 56 derives the heat generation amount H in accordance with Expression (2) indicated below.

$$\text{Heat Generation Amount } H = t \times W\text{max}/8 + t \times W\text{max}/4 + t \times W\text{max}/2 + t \times W\text{max} \quad (2)$$

A heat release amount Q can be derived in accordance with Expression (3) indicated below. A heat release coefficient α is preliminarily stored in the memory 42.

$$\text{Heat Release Amount } Q = \text{Heat Release Coefficient } \alpha \times (\text{Battery Temperature} - \text{Outside-Air Temperature}) \times \text{Total Heat Release Time } X \quad (3)$$

In step S73, the activation controller 56 derives a total heat release time X in the discharge pattern, with the heat generation amount H and the heat release amount Q of the battery 10 being equal to each other. In one example, the activation controller 56 substitutes the heat generation amount H derived in accordance with Expression (2) as the heat release amount Q into Expression (3), so as to derive the total heat release time X in accordance with Expression (3).

In step S74, the activation controller 56 derives individual partial heat release times in the discharge pattern based on the derived total heat release time X. Accordingly, the discharge pattern is confirmed.

Then, in step S75, the activation controller 56 causes the battery 10 to output electric power in accordance with the discharge pattern. For example, the activation controller 56 electrically couples the battery 10 and the temperature adjuster 12 to each other in accordance with the discharge pattern, and causes the battery 10 to supply electric power to the temperature adjuster 12 at every pulse in the discharge pattern.

In step S76, the activation controller 56 acquires an electric current detected by the current sensor 14 and a voltage detected by the voltage sensor 16 every time electric power is output in accordance with the discharge pattern. Accordingly, the electric current and the voltage when the first pulse P1 is output, the electric current and the voltage when the second pulse P2 is output, the electric current and the voltage when the third pulse P3 is output, and the electric current and the voltage when the fourth pulse P4 is output are acquired.

Subsequently, the activation controller 56 derives an estimate resistance value based on the measured electric-current values and the measured voltage values in accordance with the discharge pattern in step S77, and ends the estimate-resistance-value deriving process.

Figure 10:
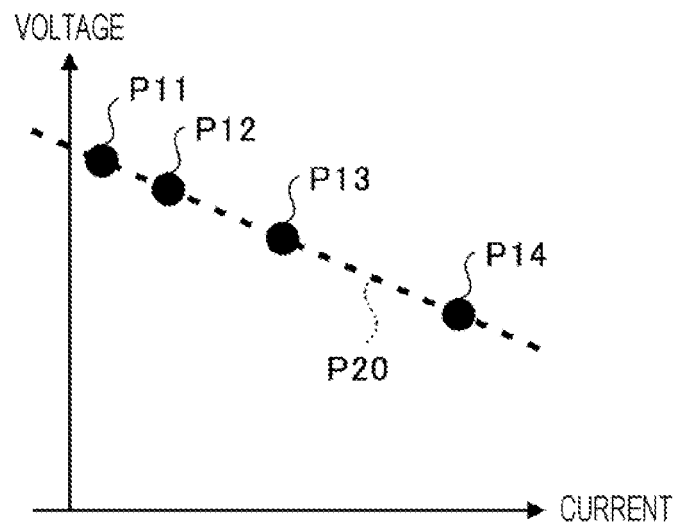
FIG. 10 is a diagram describing a method for deriving an estimate resistance value in the estimate-resistance-value deriving process.

FIG. 10 is a diagram describing a method for deriving an estimate resistance value in the estimate-resistance-value deriving process in step S58. In FIG. 10, the abscissa axis denotes an electric current, whereas the ordinate axis denotes a voltage. A black circular mark P11 in FIG. 10 indicates a plot corresponding to a measured electric-current value and a measured voltage value when the first pulse P1 is output. A black circular mark P12 indicates a plot corresponding to a measured electric-current value and a measured voltage value when the second pulse P2 is output. A black circular mark P13 indicates a plot corresponding to a measured electric-current value and a measured voltage value when the third pulse P3 is output. A black circular mark P14 indicates a plot corresponding to a measured electric-current value and a measured voltage value when the fourth pulse P4 is output.

By varying the output power among the individual pulses in the discharge pattern, the plots corresponding to the measured electric-current values and the measured voltage values are distributed, as illustrated in FIG. 10.

The activation controller 56 applies the least squares method to the electric currents and the voltages illustrated in FIG. 10 to derive a regression line indicated with a dashed line P20 in FIG. 10. The activation controller 56 derives a gradient of the derived regression line and sets the gradient as an estimate resistance value.

By deriving the estimate resistance value from the measured electric currents and the measured voltages such that the heat generation amount H and the heat release amount Q of the battery 10 are balanced out in this manner, the accuracy of the estimate resistance value can be enhanced.

Figure 11:
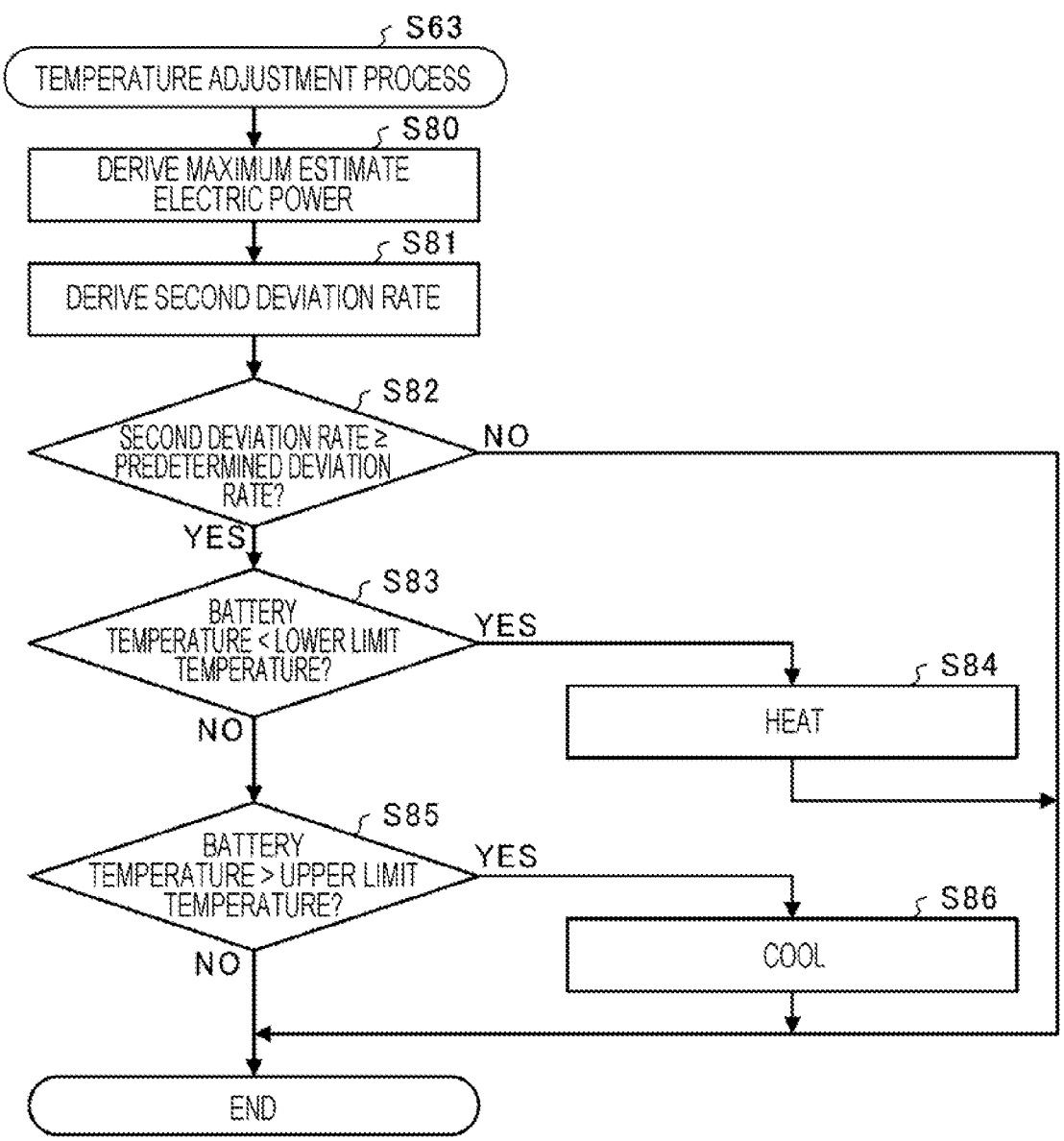
FIG. 11 is a flowchart describing the flow of a temperature adjustment process.

FIG. 11 is a flowchart describing the flow of the temperature adjustment process in step S63. When the temperature adjustment process in step S63 commences, the activation controller 56 derives a maximum estimate electric power in accordance with the output map 30 determined in step S62 in FIG. 7, the battery temperature, and the SOC in step S80.

Then, in step S81, the activation controller 56 divides the predetermined electric power by the maximum estimate electric power derived in step S80, so as to derive a second deviation rate. In step S82, the activation controller 56 determines whether the second deviation rate is above or equal to a predetermined deviation rate. The predetermined deviation rate may be set to any value.

If the second deviation rate is below the predetermined deviation rate (NO in step S82), the activation controller 56 ends the temperature adjustment process. In this case, since the deviation between the predetermined electric power and the maximum estimate electric power is small, the temperature of the battery 10 is not to be adjusted.

If the second deviation rate is above or equal to the predetermined deviation rate (YES in step S82), the activation controller 56 determines whether the battery temperature is lower than a lower limit temperature of the appropriate range in step S83. If the battery temperature is lower than the lower limit temperature (YES in step S83), the activation controller 56 performs a temperature adjustment involving controlling the temperature adjuster 12 to heat the battery 10 in step S84. The battery 10 is continuously heated until the battery temperature becomes higher than or equal to the lower limit temperature. When the battery temperature becomes higher than or equal to the lower limit temperature, the temperature adjustment process ends.

If the battery temperature is higher than or equal to the lower limit temperature (NO in step S83), the activation controller 56 determines whether the battery temperature is higher than an upper limit temperature of the appropriate range in step S85. If the battery temperature is higher than the upper limit temperature (YES in step S85), the activation controller 56 performs a temperature adjustment involving controlling the temperature adjuster 12 to cool the battery 10 in step S86. The battery 10 is continuously cooled until the battery temperature becomes lower than or equal to the upper limit temperature. When the battery temperature becomes lower than or equal to the upper limit temperature, the temperature adjustment process ends.

If the battery temperature is lower than or equal to the upper limit temperature (NO in step S85), since the battery temperature is within the appropriate range, the activation controller 56 does not adjust the temperature of the battery 10 and ends the temperature adjustment process.

This description relates to an example where the activation controller 56 performs the temperature adjustment process in step S63 after determining the output map 30. Alternatively, the temperature adjustment process in step S63 may be performed after the first constant controller 50 determines the output map 30.

Accordingly, in the battery management apparatus 1 according to this embodiment, the deterioration level of the battery 10 at the derivation point of the estimate resistance value is derived based on the estimate resistance value. In the battery management apparatus 1 according to this embodiment, the output map 30 corresponding to the derived deterioration level is determined from among the output maps 30. Accordingly, in the battery management apparatus 1 according to this embodiment, the map to be used is updated to the output map 30 corresponding to the current deterioration level. Furthermore, in the battery management apparatus 1 according to this embodiment, the electric power to be output from the battery 10 is controlled based on the determined output map 30.

Accordingly, in the battery management apparatus 1 according to this embodiment, the electric power to be output from the battery 10 is controlled to an electric power on which the progress of deterioration of the battery 10 is reflected, so that the electric power to be output from the battery 10 can be appropriately managed.

Although the embodiment of the disclosure has been described above with reference to the appended drawings, the embodiment of the disclosure is not to be limited thereto. It is apparent to a skilled person that various modifications and alterations are conceivable within the scope defined in the claims, and it is to be understood that such modifications and alterations naturally belong to the technical scope of the embodiment of the disclosure.

The battery management apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the battery management apparatus 1 including the battery 10, the temperature adjuster 12, the current sensor 14, the voltage sensor 16, the battery temperature sensor 18, the outside-air temperature sensor 20, the storage device 22, and the controller 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A battery management apparatus comprising:
   a battery;
   a storage device; and
   a controller,
   wherein the storage device stores output maps corresponding respectively to deterioration levels, each of the output maps being a map in which a maximum value of electric power outputtable from the battery is associated with a state-of-charge of the battery and a temperature of the battery, each of the deterioration levels being an indicator indicating a degree of deterioration of the battery, and
   wherein the controller comprises i) at least one processor and ii) at least one memory storing instructions that, when executed by the at least one processor, cause the at least one processor to:
   set a discharge pattern indicating a temporal transition of the electric power output from the battery, the discharge pattern being determined based on thermal parameters of the battery such that a predicted heat generation amount and a predicted heat release amount of the battery are equal to each other during discharge;
   acquire a measured electric-current value and a measured voltage value of the battery by causing the battery to output the electric power in accordance with the discharge pattern;
   derive, as an estimate resistance value, an estimate value of internal resistance of the battery based on the measured electric-current value and the measured voltage value acquired in accordance with the discharge pattern;
   derive the deterioration level at a derivation point of the estimate resistance value based on the estimate resistance value;
   determine an output map corresponding to the derived deterioration level from among the output maps; and
   control the electric power to be output from the battery based on the output map.

2. The battery management apparatus according to claim 1, wherein the at least one processor is configured to:
   derive, as actual electric power, electric power actually output from the battery based on a measured electric-current value and a measured voltage value during an energization mode of the battery;
   derive, as maximum estimate electric power, a maximum estimate value of electric power outputtable from the battery based on the output map that is currently determined;
   derive a first deviation rate indicating a degree of deviation of the actual electric power relative to the maximum estimate electric power; and
   determine whether the estimate resistance value is to be derived based on the first deviation rate.

3. The battery management apparatus according to claim 1, wherein the at least one processor is configured to:
   derive, as maximum estimate electric power, a maximum estimate value of electric power outputtable from the battery based on the output map that is currently determined;
   derive a second deviation rate indicating a degree of deviation of predetermined electric power relative to the maximum estimate electric power, the predetermined electric power being electric power used for achieving predetermined acceleration in a vehicle to which the battery management apparatus is applied; and
   determine whether the estimate resistance value is to be derived based on the second deviation rate.

4. The battery management apparatus according to claim 1, wherein the at least one processor is configured to:
   correct the deterioration level derived based on the estimate resistance value by combining the deterioration level derived based on the estimate resistance value with the deterioration level determined before the deterioration level is derived in accordance with a predetermined ratio; and
   determine the output map corresponding to the corrected deterioration level from the output maps.

* * * * *